United States Patent [19]

Eck et al.

[11] 4,396,817

[45] Aug. 2, 1983

[54] METHOD OF BROWNING FOOD IN A MICROWAVE OVEN

[75] Inventors: Phyllis Eck, Plymouth; Ronald G. Buck, Bloomington, both of Minn.

[73] Assignee: Litton Systems, Inc., Beverly Hills, Calif.

[21] Appl. No.: 136,141

[22] Filed: Mar. 31, 1980

[51] Int. Cl.³ .............................................. H05B 6/68
[52] U.S. Cl. ...................... 219/10.55 M; 219/10.55 B; 219/10.55 R; 426/243; 426/523; 99/DIG. 14; 99/451
[58] Field of Search ................... 219/10.55 B, 10.55 R, 219/10.55 M, 10.55 C; 364/900; 426/233, 241, 243, 466, 523; 99/325–328, 451, DIG. 14

[56] References Cited

U.S. PATENT DOCUMENTS

| | | | |
|---|---|---|---|
| 3,569,656 | 3/1971 | White et al. | 219/10.55 B |
| 4,158,432 | 6/1979 | Van Bavel | 364/900 |
| 4,162,381 | 7/1979 | Buck | 219/10.55 B |
| 4,188,520 | 2/1980 | Dills | 219/10.55 R |
| 4,196,330 | 4/1980 | Payne | 219/10.55 B |
| 4,198,553 | 3/1980 | Dills | 219/10.55 B |
| 4,227,062 | 10/1980 | Payne et al. | 219/10.55 R |
| 4,242,554 | 12/1980 | Hurko et al. | 219/10.55 M |
| 4,317,977 | 3/1982 | Buck | 219/10.55 M X |
| 4,332,992 | 6/1982 | Larsen et al. | 219/10.55 R |

FOREIGN PATENT DOCUMENTS

| | | | |
|---|---|---|---|
| 2751483 | 5/1979 | Fed. Rep. of Germany | 219/10.55 B |
| 51-151149 | 11/1976 | Japan | 219/10.55 B |
| 54-149046 | 11/1979 | Japan | 219/10.55 B |

OTHER PUBLICATIONS

*Food Science* by Norman N. Potter, AVI Publishing Co. Inc., 1968, pp. 50 and 140.
*Principles of Food Science*, (Part II, Physical Principles of Food Preservation), by Karel et al., Published by Macel Dekker, Inc., 1975, pp. 255–258.
Toshiba, ER-899BT, "The Brainwave", 9-79.

*Primary Examiner*—B. A. Reynolds
*Assistant Examiner*—Philip H. Leung
*Attorney, Agent, or Firm*—Robert E. Lowe; John M. Haurykiewicz

[57] ABSTRACT

A method of browning food in a microwave oven. The method comprises alternating over the entire cooking cycle the application of power to a microwave generating device with the application of power to an infrared heater. The operational periods of each type of radiation device are automatically varied over the cooking cycle. The parameters of these periods are empirically predetermined for each broad category of food and retained in a nonvolatile memory. In one embodiment, the periods are adjusted to compensate for varying quantities of food and desired donenesses by relating them to a total cooking time per unit mass empirically predetermined for each food category and doneness. Alternatively, the periods are adjusted by entering the food mass into a microprocessor in the oven. The microprocessor calculates the cooking time by use of the food category, food mass and power input to the microwave generating device. In either embodiment, the recipe may also include varying the microwave power and providing cooling air. Compensation for variations in initial heater temperatures are provided to allow cooking of a second item of food immediately after cooking a first item.

11 Claims, 2 Drawing Figures

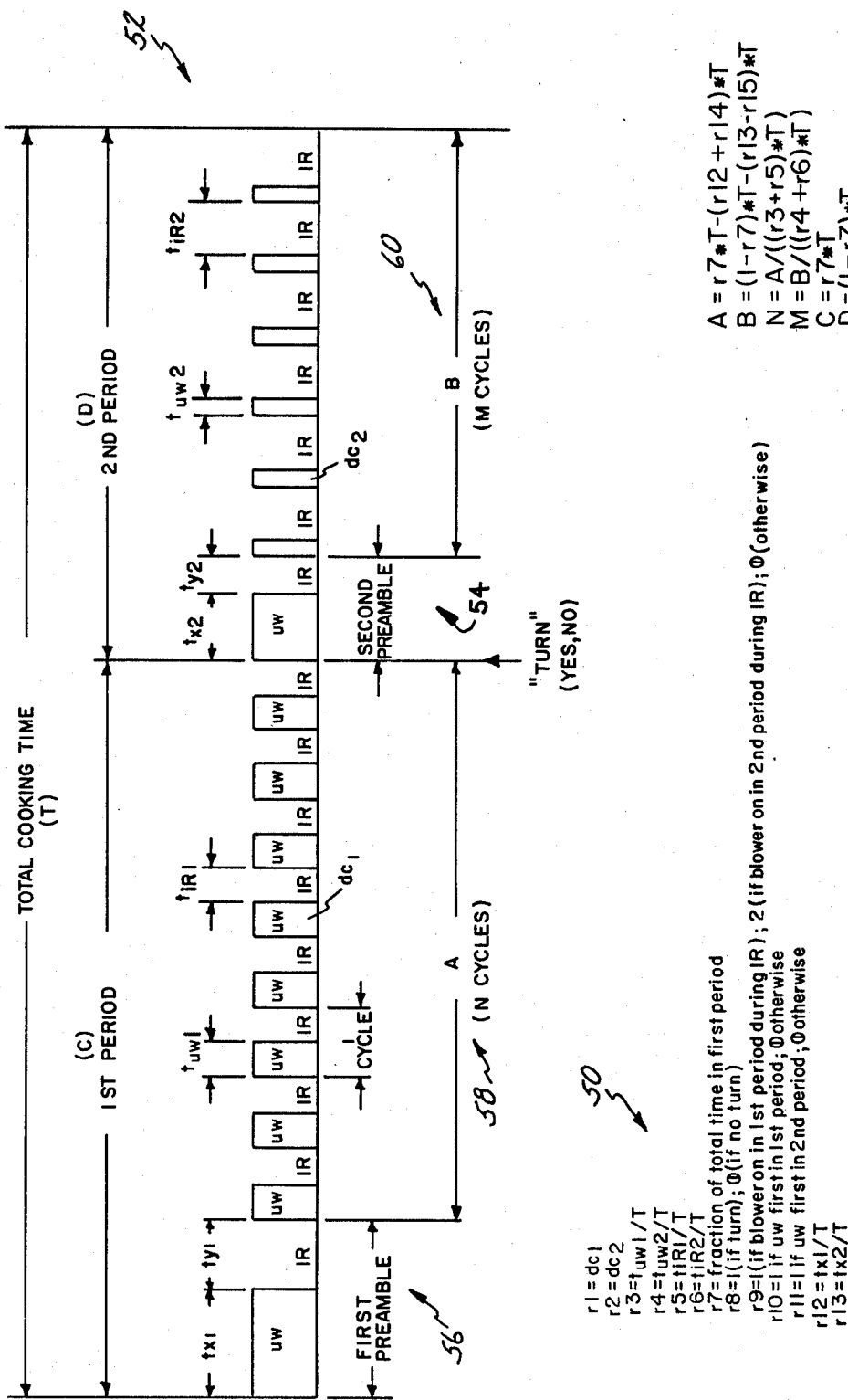

METHOD OF BROWNING FOOD IN A MICROWAVE OVEN

BACKGROUND OF THE INVENTION

1. Field of the Invention

The invention relates generally to the field of microwave ovens and more specifically to a method of cooking using both microwave and infrared radiation.

2. Description of the Prior Art

In the art of cooking by use of microwaves, it is known that some foods achieve insufficient browning by the time they are fully cooked. In a conventional oven operating by means of convection or infrared heat, the outer surface is raised to an elevated temperature and heat is conducted inwards to cook the interior of the food. The outer surface cooks longer at a higher temperature than the interior, becomes drier, and therefore, becomes more browned than the interior.

In contrast, microwave radiation does not raise the surface temperature to as high a temperature for as long a time as in conventional cooking. Juices from the interior of the food rise toward the surface of the food and accumulate there in relatively greater quantities than one finds at the surface with conventional cooking. This higher moisture content has an inhibitive effect on the rate of browning. The surface, therefore, remains substantially unbrowned compared with conventionally cooked foods by the time the interior of the food is cooked.

Prior art microwave ovens have attempted to overcome the inherent inability of microwaves to brown some foods as well as conventional ovens by including in them devices to heat the food's surface by means of convection or infrared heat. With either type of device the surface temperature is raised to a higher temperature and lower water content than it would otherwise reach when under the influence of microwaves alone; and the surface "browning" is increased.

Prior art browning devices incorporated into a microwave oven, even if they have been of the infrared radiation variety, have also incorporated into them many of the conceptual limitations found in conventional ovens. Conventional ovens even today are mere mechanical improvements over stone age fired ovens. They generally operate by raising the temperature of the surroundings to a certain degree and then conducting the heat to the food by means of convection. In this regard, the burner is fired at full power until the desired temperature is achieved. Little cooking is done by infrared radiation from the burner itself. The result is a slow, energy-inefficient, hot method of cooking. By "hot" it is meant that the oven cavity and the ambient air heat up to substantial degree, a result no longer desirable in a modern kitchen.

Such a use of heating the surroundings is found in U.S. Pat. No. 3,569,656 to White et al.. In order to achieve browning, White U.S. Pat. No. 3,569,656 adopts the methods of the conventional oven. The air and surroundings are heated with Calrod resistance heaters to precisely the same temperature as one would find in a conventional oven for a similar degree of browning (bake, roast, crisp, etc.) before the microwave device is even turned on. This is nothing more than microwave assisted conventional cooking rather than browner assisted microwave cooking.

Other devices incorporated into a microwave oven with the more limited purpose of browning rather than cooking have uniformly been operated at full power for a set period of time. This is but a variation on the broil technique found in the conventional oven. The browner gets very hot and a very hard (charred) browning is achieved to a very short depth. This varies of course with the power of the browner and the distance from the food, but the use of these devices in such a manner provides for a very limited range of browning choices.

Recognizing these limitations, U.S. Pat. No. 4,137,442 to Tateda has recently provided for a variable position browner. Variations in browning are achieved by moving the browner closer to or further away from the food. However, the device is still operated at full power for a set period of time to again limit the scope of browning degrees and depths achieveable. Moreover, this browning method requires an unnecessarily complex and expensive mechanical device to achieve its purpose.

None of these devices have exhibited any attempt to coordinate the use of the browning device with that of the microwave device to optimize both browning and cooking. Further, no prior art device or method known has a range of browning choices as well as an optimized browning/cooking recipe for each type of food which may be automatically performed by a microwave oven for cooking and browning to near perfection.

SUMMARY OF THE INVENTION

Accordingly it is an object of the present invention to provide a coordinated method of browning that provides a wide range of degrees and depths of browning without unnecessarily complex browning apparatus.

It is further an object of the present invention to provide a coordinated method of browning in a microwave oven having a range of browning from hard, low-depth browning to softer, deeper browning.

It is a further object of the present invention to provide a method of cooking primarily with microwave radiation which includes a highly variable method of browning.

It is a further object of the present invention to provide a method of browning in a microwave oven having an empirically optimized predetermined cooking/browning recipe for each broad category of food.

It is a further object of the present invention to retain this recipe in the oven for automatic, optimized cooking and browning when the cook enters the type of food to be cooked into the oven's control panel.

It is a further object of the present invention to retain the aforesaid recipe in a memory associated with the oven so as to be performed by the microwave oven when the oven is informed of the type of food to be cooked and the time it is to be cooked.

It is a further object of the present invention to perform in an alternative embodiment said cooking/browning recipe when the oven is informed of the type of food to be cooked and the quantity or mass of the food to be cooked.

It is a further object of the present invention to provide for variable food doneness by appropriate input through the microwave oven's control panel.

These and other objects which will become clear in the following detailed description are accomplished by the present invention which is believed to be adequately summarized in the abstract.

BRIEF DESCRIPTION OF THE DRAWINGS

FIG. 2 illustrates a typical cooking/browning recipe for implementation by the microprocessor along with a time chart of the program implementation of this recipe.

DESCRIPTION OF THE PREFERRED EMBODIMENT

Figure 1:
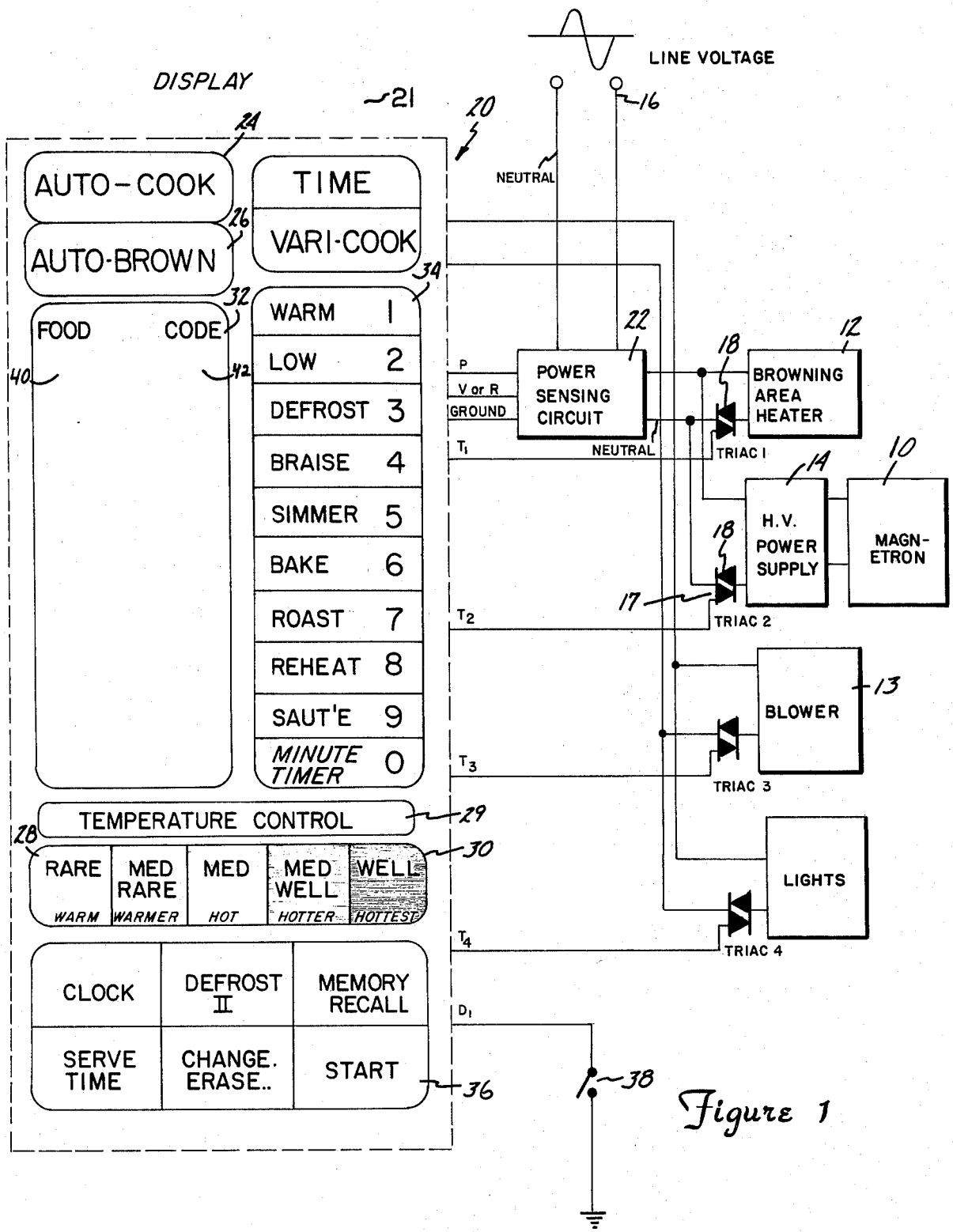
FIG. 1 is a representational view of the control panel of a microwave oven implementation of the present invention. Also represented are several of the major microwave oven devices used by the present invention and their control lines to a power supply and a microprocessor which, although not shown, is again represented by the control panel.

In the discussion of the preferred embodiment to follow, it will be assumed that the food to be cooked will be placed in a conventional microwave oven (not shown) having included therein a magnetron 10, a browning heater 12, a high voltage power supply 14 connected to the magnetron 10, a power supply 16, means, such as triacs 18, to control the application of power to the aforesaid devices, a power sensing circuit 22 interconnected to high voltage power supply 14 for magnetron 10 and to browning heater 12, a microprocessor (not shown, but represented by control panel 20) having a permanent read only memory (ROM) (not shown) which is interconnected with control panel 20, said power supply 16, and said control means 18. A power sensing circuit 22 is interconnected between the microprocessor and browning heater 12 and high voltage power supply 14.

Buttons Auto-Cook 24, Auto-Brown 26, and Rare 28 through Well 30 will be present only in that embodiment using a power sensing technique to compute total cooking time. Such a power sensing technique is disclosed in copending application Ser. No. 73,077 to Buck filed Sept. 6, 1979 now U.S. Pat. No. 4,317,977.

In that embodiment in which a power sensing technique is not used, the control panel 20 will instead have a button labelled such as Vari-Brown (not shown) in lieu of the Auto-Brown button to indicate to the microprocessor the initiation of a browning-cooking recipe rather than a microwave alone cooking recipe. Additionally, power sensing circuit 22 will not be connected to high voltage power supply 14.

Except for the food code panel 32, other buttons shown on control panel 20 such as Vari-Cook, Defrost II, etc. are included to provide the cook the option of cooking by older microwave oven methods. The numerical buttons 34 will be used in either of the present invention's preferred embodiments to enter such information as food code, food mass or cooking time into the microprocessor. The start button 36 initiates cooking as in the prior art.

In the prior art, door interlock 38 prevents the operation of the microwave oven while the door is open. Additionally, in the present invention, it provides a signal to the microprocessor when the cook has performed the programmed request to turn the food over.

FIG. 2 illustrates a representative chart 52 of the cooking program performed by the microprocessor using a typical recipe of the preferred embodiment. In the following discussion, the total cooking time T is entered by the cook. In the alternative embodiment, this cooking time is instead calculated from food type, food mass, doneness selected and average measured power input to the magnetron 10.

After placing the food in the oven and closing the door, the cook enters into the microprocessor via the control panel 20 the type of food which is to be cooked and the total cooking time.

The type of food to be cooked is preferably represented by a two digit number code entered via push buttons 34. The code which is appropriate for a particular food type is listed on the control panel area 32. This area 32 would preferably have two columns of information. The left column 40 would list various types of food such as roast, hamburger, pie, rolls, vegetables etc. The right hand column 42 would list a corresponding two digit number code. The entry of this code into the control panel 20 after having selected the browning function by pushing the Auto-Brown button 26, causes the microprocessor to select the appropriate recipe for that type of food from the associated read-only-memory.

In this manner, up to 100 (00–99) separate food types and recipes can be categorized. If all such food types cannot be listed on the control panel 20 itself due to space limitations, the control panel can list the more common food types and the balance can be listed in a cookbook which may be provided to the consumer upon the sale of the microwave oven.

The cook would then enter the total cooking time T via the numerical buttons 34. The total cooking time would be based upon a suggested recipe time from a cookbook of how long to cook a particular quantity of that type of food to a preselect range of donenesses, i.e. from rare to well done and a number of gradations therebetween. The cook may, of course, refine these choices not only to accommodate his own personal taste, but also to accommodate finer gradations in mass or quantity and the cooking pans he uses.

As mentioned above, the microprocessor then uses the food code entered by the cook to look up a recipe for that food type located in a read-only-memory module. This recipe is comprised of a number of constants 50, totalling 17 in the preferred embodiment, which provides the microprocessor the information it needs to run the cooking program 52. Included therein is such information as to how long relatively the microwave generating device is to be on, how long relatively the infrared heater is to be on, and in which order they are to be on, etc.

Each of these constants 50 will have been empirically predetermined by expert cooks operating the microwave generating device 10 and the infrared heater 12 in the microwave oven in various sequences, for various times and at various powers to obtain optimum cooking and browning for a given type of food. The microprocessor will use these constants to reproduce exactly the same sequence of operations performed by the expert cook to give optimum results each time the microwave oven is used at home.

Needless to say, the proper sequencing, power settings, etc. is highly idiosyncratic to food type. The method of the present invention can thus provide excellent cooking and browning for many categories of foods, results never before achievable in a microwave oven.

It has been discovered that the combination of microwave and infrared radiation which both cooks and browns the best is alternating the application of each over a cooking cycle. The order in which they are applied, and the duration and power of each are, of course, dependent upon food type.

Thus, referring again to FIG. 2, the recipe 50 includes constants, such as r10 and r11, which indicate in which order microwave and infrared radiation should be applied. If microwave radiation is to be applied first, a time chart of the cooking program executed by the microprocessor will result in a chart 52 as illustrated in FIG. 2.

The specification of a specific constant number, such as r11, is only suggestive. The actual constant may be a single bit of information located anywhere in the read-only-memory section allocated for a particular recipe.

As can be seen from the time chart 52, the cooking program executed by the microprocessor using the recipe 50 is broken into two major periods, C and D. The inclusion of two separate periods C and D allows the microprocessor to interrupt cooking at some predetermined percentage of time, indicated by r7, to provide for the turning over of the food, the readjusting of the power levels and cycle times and the order of cycling of the radiation devices 10 and 12. Of course, depending on the food type, no turning may be necessary and the power levels, cycle times, and order may remain entirely unchanged.

It has been found that little or no browning will occur unless the food reaches a certain food dependent temperature. Below this temperature, an essential function of either the infrared heater 12 or the microwave generating device 10 is to raise the temperature of the food. For most foods it is both desirable, faster, and energy efficient to use microwave radiation to bring the food up to temperature. It has also been found that the initial use of microwave radiation for this purpose will provide for superior browning later in the cooking cycle. But with certain foods, such as pastries and frozen pies, an initial period of infrared is desirable to harden the crust to prevent water pockets from forming later.

While the browning reaction is not well understood, it seems to proceed most rapidly and satisfactorily under certain conditions relative to food temperature, water content, water activity, air humidity and temperature, and activation energy. A prime factor in the reaction is water (and perhaps related water activity). Water is necessary to both "lubricate" the reaction and to provide a source of reactants. However, the reaction also releases a great deal more water than it consumes. Thus the presence of too much water can retard the reaction.

With conventional cooking, the water content of the surface region of the food is continuously drawn off into vapor by the presence of hot air adjacent the surface. Thus the browning reaction can proceed apace without an undue buildup of water.

With microwave cooking, the only present source of increased evaporation is the continuously operated air blower. But since it operates at reduced temperatures vis-a-vis conventionally heated ambient air, its moisture absorbing capabilities remain limited. Furthermore, the evaporation itself reduces the temperature of the surface area which thereby reduces the energy available to drive the browning reaction as well as reduces the energy available to further vaporize surface area water.

Recognizing these problems with microwave oven browning, the present invention uses the infrared heater 12 to provide additional energy to the surface area of the food specifically to increase the vaporization rate of the surface area water, to increase water activity, and to increase the reaction activation energy available.

In this regard, the air blower 13, which is normally operated throughout the periods in which the microwave generating device 10 is on, may also be operated with the heater 12 to increase the rate of evaporation or to reduce (by cooling) the rate of the browning reaction. A constant r9 is provided to indicate whether the air blower 13 should be on during the infrared portions of the first period D.

The period of time for which the microwave generating device is on during the preamble 56 is determined by constant r12 and by cooking time T entered by the cook. This time, tx1, is the result of the multiplication of constant r12 by time T.

The power applied to the microwave generating device 10 is given by constant r16. The constant may be used to set the duty cycle, dcx1, of a magnetron 10 for example. Varying the duty cycle of a magnetron is a conventional technique for varying the cummulative microwave power input to the microwave oven's cavity. The duty cycle, dcx1, of the magnetron 10 may be controlled by the microprocessor by controlling the percentage of time triac 17 is enabled.

Variations in power are necessary to adjust microwave cooking for different food's capabilities to absorb microwave energy as well as their ability to transfer heat.

After the microwave generating device 10 has raised the temperature of the food sufficiently, the infrared heater 12 is turned on. This initial period may be longer as the heater 12, starting cold, may have a delay to bring it up to a temperature at which it will begin browning the food efficiently.

Most microwave ovens in the United States use a 120 volt, 1800 watt maximum power supply. This power is insufficient to operate both the microwave generating device 10 and the infrared heater 12 simultaneously. Thus all representations of the preferred embodiment illustrated and discussed herein will have either one or the other device on at any given moment, but not both. It should be noted at this point that if the microwave generating device 10 is a magnetron, a power level of 70% of full power means that the microprocessor is applying power to the high voltage power supply 14 only 70% of the time. The other 30% may conveniently be used to supply power to the infrared generating device 12.

The period of time during which power is applied to the infrared heater 12 is indicated by ty1. Time ty1 is determined by multiplying constant r14 by cooking T. As an essential purpose of this initial period is to bring the heater from room temperature up to the temperature range at which it will be used in succeeding cycles to brown the food, various infrared heaters have varying response times. Accordingly, the length of this period will vary with the infrared heater used.

Many times the cook will use his microwave oven to cook a second item of food immediately after the first item is done. In such a case, the infrared heater may be well above room temperature to begin with and require a much shorter time to reach operational temperatures. Also, because it (and the oven to a lesser extent) is hot to begin with, it will assist, even before it is turned on, in bringing the food up to temperature sooner during the microwave portion of preamble 56. It will also raise the surface temperature of the food to a higher temperature than it would otherwise be. In many foods, it has also been observed that it also causes an increase in surface water content which can impede the browning reaction. In order to provide for a uniform result independent of initial conditions, these effects must be compensated for. The manner of compensation must of course be empirically determined for each food, but it may involve reducing or increasing the initial microwave period, reducing or increasing the initial infrared period, or applying blown air in combination with the above to increase evaporation.

To provide appropriate compensation, the microprocessor must know the initial temperature of the infrared heater. Depending on food type and the form of compensation which may be necessary, this measurement may be taken either at the very beginning of the cooking algorithm or just prior to applying power to the infrared generating device 12 during the first preamble period 56.

The temperature of the infrared heater 12 may be determined by the resistance of its heater element (not shown). The temperature is given by the formula $$T = To + \frac{1}{\alpha}(R - R°)$$

where To is a predetermined temperature such as 20° C., R° is the resistance of the heater element at this temperature, R is the measured resistance, and $\alpha$ is a temperature coefficient for the heater in ohms per degree centigrade. The constant $\alpha$ may be derived from the standard temperature coefficient for the metal used in the resistance element by multiplying it by the resistance R°.

The resistance of heater 12 is measured by measuring the voltage and current into heater 12. The power sensing circuit 22 of FIG. 1 measures both voltage and current and returns them to the microprocessor. The resistance then is v/I. This circuit 22 may be of conventional design.

While not implemented in the preferred embodiment, this power sensing circuit may also conveniently be used to provide voltage or constant power regulation to the infrared heater 12 to compensate for manufacturing variations from heater to heater and for line voltage variation.

Immediately after the first preamble 56, microwave radiation of a fixed duration and power is cycled with the application of power to the infrared heater 12 a fixed number of times, N. The length of the microwave half cycle, tuw1, is determined by constant r3 multiplied by cooking time T. The microwave power, dc1, is determined by a constant r1 which may be used to set the magnetron's 1 duty cycle. The length of time power is applied to the infrared heater in a half cycle, tir1, is determined by a constant r5. The total number of cycles, N, is determined by the cooking time T multiplied by constant r7, minus the nominal preamble time, tx1+ty1, this entire sum divided by the cycle time, tuw1+tir1. Or, as T is a multiplier for all terms this equation may be restated as $$N = \frac{r7 - (r12 + r14)}{r3 + r5}.$$

As was mentioned supra, during the preamble period 56, the food was brought up to a temperature at which browning may begin and the infrared heater was activated to both bring it up to temperature and begin drying and browning the food. During the period of time the infrared heater was on, heat induced regionally by microwave radiation will have had time to conduct to lower temperature areas of the food. The food is now ready to accept more microwave radiation to both continue cooking and to maintain water level and temperature of the surface region of the food for browning purposes. Thus the infrared heater is cycled with the microwave generating device 10 in a coordinated fashion to maintain the food surface at the proper conditions for best browning as cooking proceeds. The food is both cooked and browned in an optimal manner.

At the end of N cycles, normally when about 70% of the cooking time T has elapsed, the program enters into the second period D.

The first operation at the beginning of this period D is to determine from a constant r8 whether to turn the food over. The reason this must be done for certain foods lies partly in the fact that a single infrared heater located on the roof of the microwave oven cavity is highly directional. It browns only the top of the food. With some foods this may be all that is desired, such as with cupcakes. With other foods, though, the food must be turned over to brown the bottom.

If turning is indicated, the microprocessor signals the cook with appropriate indicators: flashing lights, audible alarms or some combination thereof, that it is time to turn the food over.

In response, the cook opens the microwave oven door, turns the food over, and closes the door. The closing of the door is signaled by door interlock 38. The microprocessor then resumes cooking.

If the cook is tardy or unavailable to turn the food over, a timer may be provided to restart cooking after a set period, such as 30 seconds. Thereafter the cook may still turn the food over without serious interference with the cooking program, but overall browning will necessarily be uneven.

During the second cooking period D, it is again desirable to provide the capability for either radiation device 10 or 12 to be operated first in time. This provides for maximum flexibility in accomodating the cooking and browning requirements of different types of food. Constant r11 is used to provide this indication.

Assuming constant r11 indicates microwave radiation is to be applied first, cooking period D would appear as represented in FIG. 2. Period D is again divided into two parts, a preamble period 54 and a cycling period 60.

The second preamble period 54 allows further flexibility in accomodating the cooking needs of various types of food.

Depending on food, the preamble 54 may be substantially a long microwave period to finish cooking, or it may be a long infrared period to provide for more browning.

The time the microwave generating device 10 is activated, tx2, is determined by constant r13 multiplied by cooking time T. The power at which the microwave generating device 10 is run is determined by constant r17. This constant r17 may be used to set a magnetron duty cycle, dcx2.

The period the infrared heater is on is determined by constant r15 multiplied by cooking time T. This time, ty2, may again be modified as is the first preamble's infrared heater time, ty1, by the initial temperature of the heater in the same manner as described above. The heater will generally be on longer during this second preamble 54 to dry the accumulated juices on the bottom of the food which has just been turned over.

At the completion of the application of infrared radiation during the second preamble 54, the microprocessor again cycles the microwave radiation with the infrared for a fixed number of cycles M. A given cycle radiates microwave for a time, tuw2 and then infrared for a time, tir2. Tuw2 is determined from constant r4 multiplied by cooking time T, and tir2 is determined from constant r6 multiplied by cooking time T. The total number of cycles M is determined by the length of the period D, minus the second preamble time, tx2+ty2, divided by the cycle time, tuw2+tir2. As all terms have T as a factor, the equation reduces to $$M = \frac{(1-r7) - r13 - r15}{r4 + r6}$$

During this second period of cycling B, it will generally be found for most foods that short bursts of microwave radiation will be followed by long periods of infrared radiation. At the temperatures reached during this period B, browning will be most rapid. In addition, a large amount of heat will have been built up by the microwave radiation in a relatively limited area due to the sometimes poor thermal conductivity of the food. Thus it is desirable to reduce the rate microwave energy is "pumped" into the food to allow the heat to spread through the food to provide more even cooking.

To reduce still further the rate of flow of microwave energy into the food, constant r2 is used to set the power level of the microwave generating device lower. If the device is a magnetron 10, r2 may be its duty cycle, dc2.

At the completion of cycling period B, the microprocessor signals the cook that the food is done. Of course, the food might not be fully cooked in the sense that in some foods there should be a period in which the heat built up in some areas of the food is allowed to conduct to lower temperature areas of the food to finish the cooking in those areas. This practice is common today.

An alternative embodiment contains all the features of the first embodiment with the addition that the cook inputs to the microprocessor the mass (or quantity) of the food to be cooked instead of the time. He also selects a doneness such as RARE 28 from a set of donenesses 29 on the control panel 20 by pressing the button 28 marked RARE. (The buttons 29, as can be seen from FIG. 1, also contain subheadings indicating degrees of doneness from warm 28 to hottest 30. These categories may be used where RARE 28 to WELL 30 are inappropriate for the food to be cooked, such as with a cup of coffee. Also the buttons may be color coded with shades of brown, from light brown on button 28 to dark brown on button 30.)

The microprocessor uses the food code 32 previously entered along with the doneness 28 selected to index an array of empirically predetermined constants $X_{F,D}$ for each food type and doneness. As food types range from 00 to 99 and as there are five doneness categories 29, this array would be 100 by 5 and contain 500 $X_{F,D}$ constants.

The microprocessor uses the indexed constant in the formula $$T = \frac{M X_{F,D}}{P}$$

to calculate the total cooking time T, where M is the food mass and P is the averaged measured power. This method is disclosed in the copending application of Buck, Ser. No. 73,077. Of course, in that application, microwave power was applied constantly at full or at a predetermined power. The above equation must be modified to adjust cooking time for the periods that the microwave generating device is off and for the various power levels at which the microwave generating device 10 will be operating.

The computed value of T may then be used to compute the actual operating times of the two radiation devices 10 or 12 in the cooking program. P must be average because the instantaneous power input to the magnetron 10 may fluctuate widely due to varying impedances on the magnetron output and varying line voltages on the power supply 16. The value of T will then vary slightly during the running of the program, but this variance will become progressively less as the number of samples increases.

In both embodiments, the actual run time Tr may be retained by the microprocessor and a time-to-complete, Tc, where $$Tc = T - Tr$$

may be displayed to the cook on a display 21.

The power sensing circuit 22 to measure power input to the infrared heater 12 and the magnetron 10 may be of conventional design.

While not implemented in the preferred embodiment, it is possible to also include a set of buttons on the control panel giving the cook a range of browning choices independent of the doneness buttons 29. As explained above, doneness is basically an internal phenomena while browning is a surface phenomena, and the two are not totally dependent upon each other. The disclosed method may be altered by those skilled in the art to implement separate browning choices.

This completes a detailed description of the preferred embodiments. It is to be understood that the method of the present invention is not limited to the specific set of hardware disclosed herein. Many variations may be incorporated into the actual design of the hardware to implement the disclosed method. All of these are to be understood to be within the scope of the present invention.

Wherefore, in view of the above specification, we claim:

1. A method of cooking and browning food in a microwave oven comprising:
    (a) storing a plurality of predetermined cooking/browning recipes internal to a microwave oven controller in an electronic memory;
    (b) selecting and thereafter operating under the automatic control of one from said plurality of said predetermined cooking/browning recipes, each having a browning portion and a cooking portion, according to the type of food and degree of doneness and browning desired where said operating under said selected recipe comprises the following steps to increase water activity and energy necessary to meet activation energy requirements at the surface of said food:
        i. initially applying microwaves to a food to raise the surface region temperature to at least that at which browning may begin; and thereafter ii. applying infrared radiation from an infrared heater to provide additional energy to the surface of the food thereby increasing the vaporization rate of water to brown the surface region of the food according to said browning portion of said selected recipe;

iii. applying microwaves to cook the food according to said cooking portion of said selected recipe;

iv. controlling the average power level of said infrared radiation and said microwaves in steps ii. and iii. according to said selected recipe to obtain the desired degree of doneness and browning of the food; and v. terminating said applications of infrared radiation and mirowaves in steps ii. and iii. upon completion of total cooking time in accord with said selected recipe.

2. A method of cooking and browning food in a microwave oven comprising:

(a) providing a microwave oven controller having a plurality of predetermined cooking/browning recipes stored in an electronic memory of said microwave oven controller, each recipe having a predetermined food type dependent minimum temperature for browning and optimum surface region moisture level for quickest browning;

(b) selecting one of said recipes;

(d) inputting the amount of food to be cooked and the degree of doneness desired into said controller;

(d) operating said controller automatically according to said selected recipe by:

i. initially applying microwaves to a food to raise the temperature of the surface of the food to at least a predetermined food type dependent temperature at which significant browning may occur and which approaches the value of water activity for which maximum browning rate occurs for that food type;

ii. applying power to an infrared heater whose radiation irradiates said food to reduce water content of the surface region of said food toward a predetermined food type dependent level at which the browning reaction is most rapid;

iii. applying microwaves to further cook said food and provide further supplies of water from an interior region of said food to said surface region to balance that being withdrawn by action of said infrared radiation;

iv. controlling steps i, ii, and iii to both cook and brown said food at a predetermined rate;

v. terminating said cooking and browning upon completion of total cooking time as determined by said controller in accord with said selected recipe, said amount of food and said desired doneness.

3. The method of claim 1 or 2 further including turning the food over to brown the bottom of the food and wherein said terminating step includes completing cooking substantially at the same time as completing browning of said bottom.

4. The method of claim 1 or 2 wherein said food includes a pastry crust and further including an initial period before the first application of microwaves wherein infrared radiation is applied to said food to harden said pastry crust.

5. The method of claim 1 or 2 further including the step of moving air across said food to increase the rate of surface drying.

6. The method of claim 1 or 2 including the seps of measuring the temperature of said infrared heater prior to the application of power thereto and adjusting said initial application of microwaves and said application of infrared radiation whenever said heater temperature exceeds a predetermined level.

7. The method of claim 1 or 2 wherein the periods of time, sequences, and power levels for each of said steps are predetermined for a plurality of types of food per unit of mass; reduced to parameters for implementation by a cooking algorithm; stored in a memory associated with said microwave oven for performance by a microprocessor controllably interconnected with said memory and a control panel; whereby entering codes corresponding to one of said food types and to its mass via said control panel into said microprocessor causes said microprocessor to fetch said parameters from said memory and execute said cooking algorithm utilizing said parameters and said food mass.

8. The method of claim 7 wherein said indication of mass is provided by entering overall cooking time into said microprocessor via said control panel.

9. The method of claim 7 wherein said indication of mass is provided by entering said foods' mass in appropriate units of weight or quantity into said microprocessor via said control panel.

10. The method of claim 1 or 2 wherein the source of infrared radiation is a heater having electric power input and wherein the application of power to said heater is regulated to provide constant output power.

11. A method of utilizing a microwave oven to minimize total cooking time required to obtain the desired degree of internal doneness and external surface browning for each of a plurality of food types comprising:

(a) developing a set of parameters for an individual food type to arrive at the desired degree of internal doneness and external browning in a minimum time by empirically determining the amount and rate of:

i. microwaves needed to obtain desired internal doneness while increasing water activity, and ii. increased infrared radiation needed to increase rate of evaporation of water at the surface of said food type and to contribute to the activation energy required for desired browning;

(b) repeating step (a) for a plurality of individual food types;

(c) storing said developed sets of parameters in an electronic memory of a microwave oven controller;

(d) selecting one of said stored parameter sets;

(e) inputting a numerical value corresponding to the mass of food to be cooked;

(f) operating said controller according to said selected parameter set by alternately applying said increased amount of infrared radiation from an infrared heater and microwaves in accord with said selected parameter set; and (g) terminating step (f) upon completion of a total cooking time in accord with said selected parameter set, and said inputted numerical value.

* * * * *